US006244390B1

(12) United States Patent
Yeo et al.

(10) Patent No.: US 6,244,390 B1
(45) Date of Patent: Jun. 12, 2001

(54) INGROUND LIFT

(75) Inventors: Harold Yeo, Waterloo; Helon Rzhevsky, Thornhill; Michael Bruyns, Oakville, all of (CA)

(73) Assignee: Wheeltronic Ltd., Mississauga (CA)

(*) Notice: Subject to any disclaimer, the term of this patent is extended or adjusted under 35 U.S.C. 154(b) by 0 days.

(21) Appl. No.: 09/388,614

(22) Filed: Sep. 2, 1999

(30) Foreign Application Priority Data

Aug. 31, 1999 (CA) ........ 2281260

(51) Int. Cl.$^{7}$ ........ B60S 13/00

(52) U.S. Cl. ........ 187/211; 187/205; 187/208; 187/219; 187/269

(58) Field of Search ........ 187/205, 208, 187/211, 215, 216, 218, 219, 269, 210

(56) References Cited

U.S. PATENT DOCUMENTS

| | | | | |
|---|---|---|---|---|
| 2,733,777 | * | 2/1956 | Hott et al. | 187/218 |
| 3,757,898 | * | 9/1973 | Mitchell et al. | 187/205 |
| 4,261,079 | * | 4/1981 | Masini et al. | 187/269 |
| 4,825,977 | * | 5/1989 | Isogai | 187/203 |
| 4,830,147 | * | 5/1989 | Kawada | 187/205 |
| 4,854,421 | * | 8/1989 | Kawada | 187/211 |
| 5,016,858 | * | 5/1991 | Mitchell | 254/45 |
| 5,031,726 | * | 7/1991 | Wakamiya | 187/211 |
| 5,036,951 | * | 8/1991 | Frangos | 187/205 |
| 5,090,508 | * | 2/1992 | Nishikawa | 187/211 |
| 5,143,179 | * | 9/1992 | Hornstein | 187/205 |
| 5,450,928 | * | 9/1995 | Isogai | 187/205 |
| 5,460,460 | * | 10/1995 | Alexander | 187/269 |
| 5,501,296 | * | 3/1996 | Fletcher | 187/210 |
| 5,538,357 | * | 7/1996 | Boswell, Sr. | 187/211 |
| 5,573,083 | * | 11/1996 | Fletcher et al. | 187/205 |
| 5,636,711 | * | 6/1997 | Nussbaum | 187/269 |
| 5,980,185 | * | 11/1999 | Vita | 414/254 |

* cited by examiner

*Primary Examiner*—Dean J. Kramer
*Assistant Examiner*—Paul T. Chin
(74) *Attorney, Agent, or Firm*—Eugene J.A. Gierczak

(57) ABSTRACT

A lift for a vehicle comprising a displaceable support device moveable between a first inground position to a second above ground position for supporting the vehicle, scissor mechanism associated with the displaceable support device for lifting the displaceable support structure and the vehicle, support frame member disposed inground, the scissor mechanism contained in the support frame member where the displaceable support device moves between the first and second positions.

18 Claims, 20 Drawing Sheets

INGROUND LIFT

DESCRIPTION

1. Field of Invention

This invention relates generally to a lift for a vehicle and particularly relates to an inground lift and more specifically relates to an inground lift with a receptacle for housing the lift mechanism which includes scissor arm assemblies.

2. Background Art

There have been a wide variety of lifts which have been heretofore manufactured and designed to raise and lower vehicles from the ground to permit working on said vehicles. Such lifts can include either two post or four posts or scissor lifts.

Generally speaking many of these lifts have been designed to be disposed above ground, that is such post and scissor mechanisms have been located above ground when they are in their collapsed position permitting a vehicle to be driven thereon as well as their extended lift position.

There have been a variety of attempts to include lifting mechanisms below or inground.

For example, U.S. Pat. No. 4,830,147 relates to a jacking device used for lifting a motor vehicle when repairing it and includes at least one jack installed in a floor pit and at least two horizontally spaced apart parallel pairs of links designed for simultaneous movement along two parallel vertical planes respectively.

Another arrangement is shown in U.S. Pat. No. 5,143,179 which relates to a lifting hoist for motor vehicles where the hoist includes a pit having a foundation, side walls and end walls; lifting cylinder means comprising at least one hollow lifting cylinder mounted in the pit and adapted to hold the motor vehicle carrying apparatus on the upper end thereof, the interior of the lifting cylinder being opened to pressurized fluid, the top end of the cylinder being sealed by a cover plate, and a high pressure unit for providing pressurized oil to the lifting means.

Yet another arrangement is shown in U.S. Pat. No. 2,733,777 which illustrates a lifting mechanism comprising a base having means whereby it may be mounted on the upper end of the moveable element of the lifting mechanism, tiltable load supporting members mounted on the base adjacent the respective ends thereof on substantially pivotal axis, each load supporting member having a part extending below the pivotal axis thereof, a connecting member mounted on the base for movement above a vertical axis below the ends thereof, elongated rigid members pivotally connected with the vertical axis and pivotally connected with the downwardly extending parts of the respective load supporting members.

Yet another arrangement is shown in U.S. Pat. No. 5,036,951 which relates to an elevator type storage structure for storing objects received at access level at a vertically spaced storage level.

Furthermore U.S. Pat. No. 5,450,928 shows a lift used for maintenance and repair of automobiles.

Finally an organization identified as "Rotary Lift" from Madison, Ind. manufactures inground lifts having a receptacle below ground sold under the trademark "ROTARY" as model number SL9.

Such prior art devices present relatively complicated structures. Moreover there is a need for a reliable inground scissor mechanism lift which is easier to construct and more reliable and stable.

DISCLOSURE OF INVENTION

It is an aspect of this invention to provide a lift for a vehicle comprising a displaceable support means moveable between a first inground position to a second above ground position for supporting said vehicle; scissor means associated with said displaceable support means for lifting said displaceable support means and said vehicle.

It is a further aspect of this invention to provide an inground lift for lifting a vehicle comprising support frame means adapted to be disposed in a pit; displaceable support means co-operating with said support frame means and moveable between a first inground position to a second support position so as to lift said vehicle; scissor means associated with said displaceable support means for moving said displaceable support means and said vehicle from said first position to said second support position.

It is a further aspect of this invention to provide an inground lift for lifting a vehicle comprising a pit in the ground; a receptacle disposed within said pit and having an upper end substantially level with said ground; an upper stationary support frame fixedly secured to said upper end of said receptacle, and presenting two spaced guide bushings; a lower support frame moveable within said receptacle; an upper and lower pair of scissor assemblies disposed between said stationary support frame and said moveable support frame; each of said upper pair of scissor assemblies comprising first and second arms pivotally connected generally between their ends; said first scissor arm having an upper end slideably secured to said stationary support frame; said second scissor arm having an upper end slideably secured to said stationary support frame; each of said lower pair of scissor arm assemblies comprising first and second scissor arms pivotally connected generally between their ends; said first scissor arm having a lower end slideably secured to said moveable support frame; said second scissor arm having a lower end slideably secured to said moveable support frame; said lower ends of said first and second arms of said upper pair of scissor assemblies pivotally connected to the upper arms of said first and second arms of said lower pair of scissor arm assemblies; a pair of support columns, each said support column having one end secured to said lower moveable support frame and an upper end slideably received by said guide bushings; a hydraulic cylinder having one end connected to one of said first and second scissor arms of said upper pair of scissor arm assemblies and the other end connected to one of said first and second scissor arms of said lower pair of scissor arm assemblies.

Figure 1:
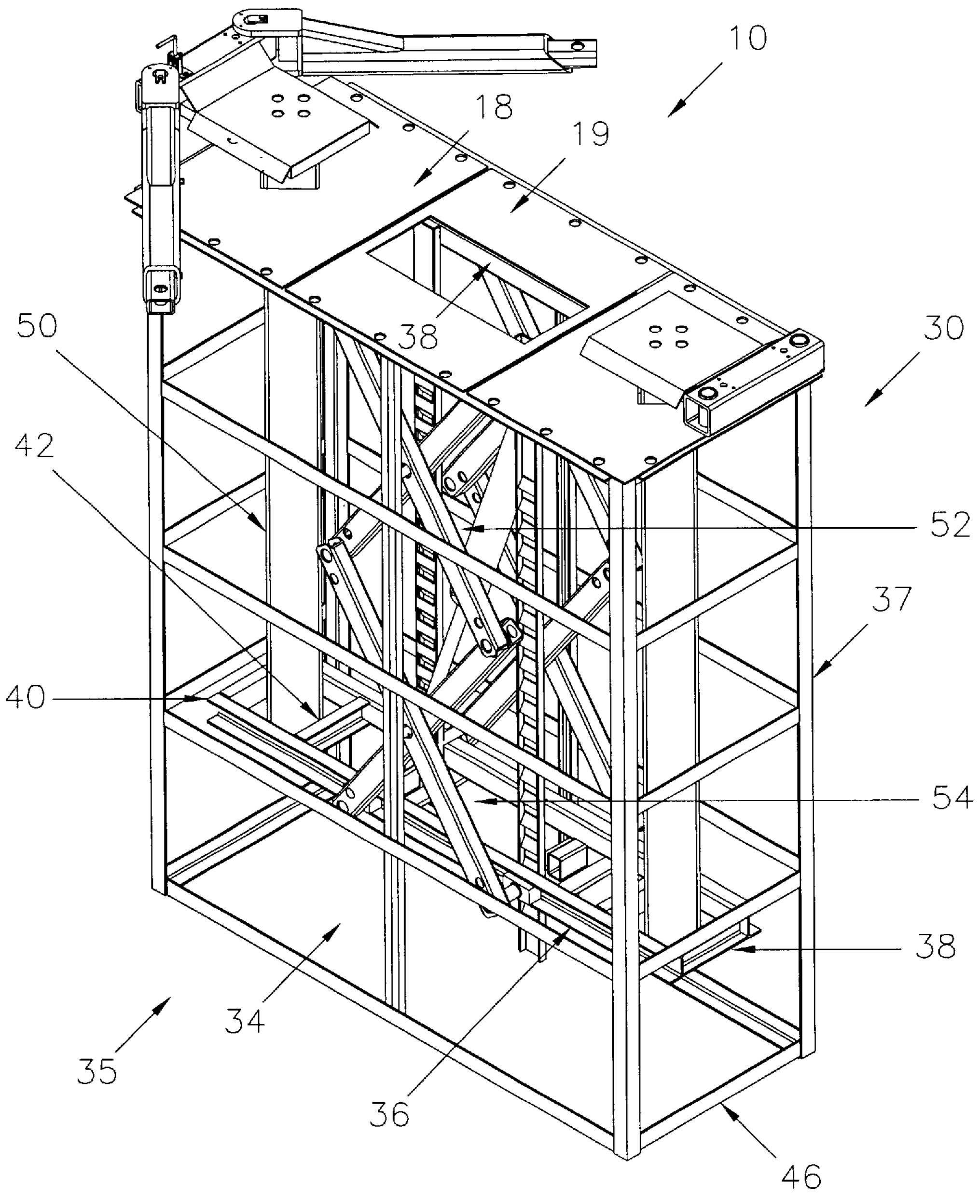
FIG. 1 is a perspective view of the inground lift in a first inground or inoperable position.

In the drawings preferred embodiments of the invention illustrated by way of example. It is expressly understood that the description and the drawings are only for the purpose of illustration and as an aid to understanding and are not intended as a definition of the limits of the invention.

BEST MODE FOR CARRYING OUT THE INVENTION

In the description which follows, like parts are marked throughout the specification and the drawings with the same respective reference numerals. The drawings are not necessarily to scale and in some instances proportions may have been exaggerated in order to more clearly depict certain features of the invention.

Figure 2:
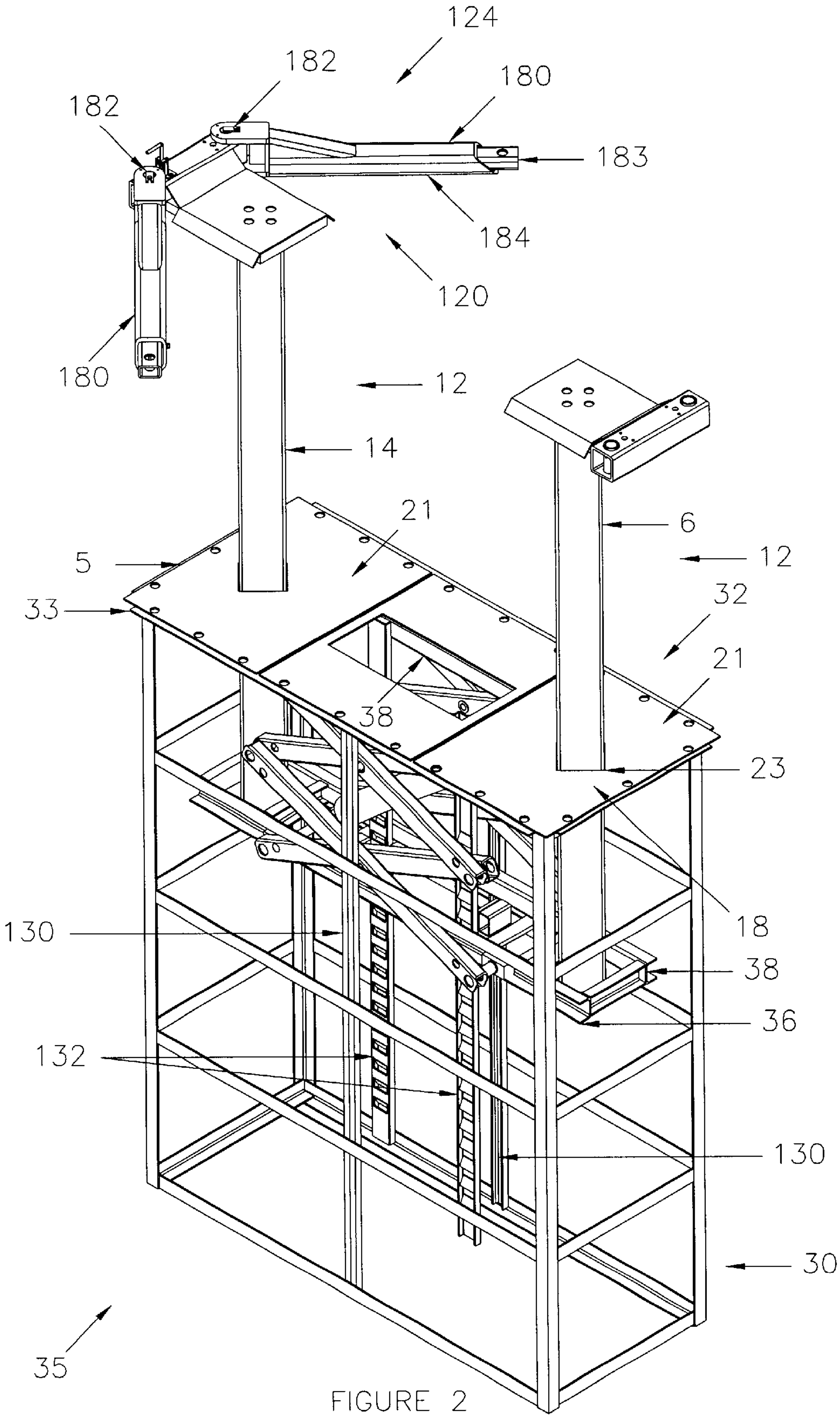
FIG. 2 is a perspective view of the inground lift in an operable or above ground position.
Figure 3:
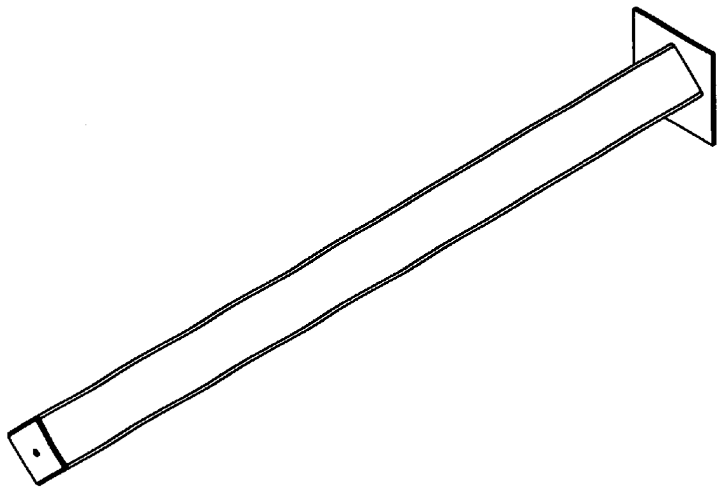
FIG. 3 is a perspective view of the support column.
Figure 4:
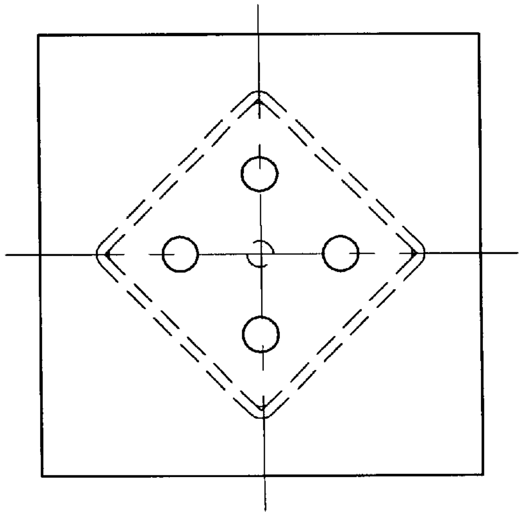
FIG. 4 is a bottom plan view of the support column.
Figure 5:
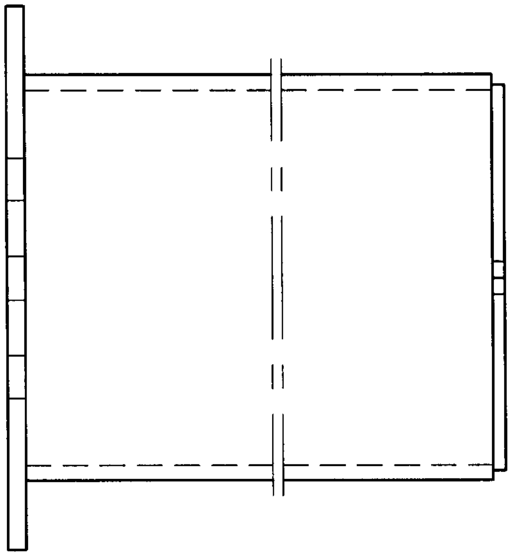
FIG. 5 is a side view of the support column where the support column has been truncated..
Figure 6:
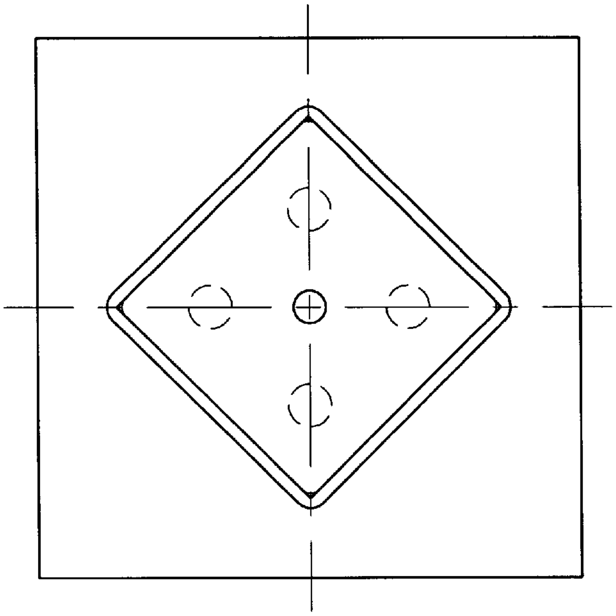
FIG. 6 is a top plan view of the support column.

FIG. 1 generally illustrates a lift in a first inground position (i.e. the lifting arms 180 are sufficiently close to the ground to permit a vehicle to be driven over) while FIG. 2 illustrates the lift 10 in a second operable or above ground position. The lift 10 includes displaceable support means 12 which generally comprise a pair of support columns 14 and 16 which are adapted to lift and support a vehicle when the inground lift 10 is in a second operable position as shown in FIG. 2. The support columns 14 and 16 illustrated in the embodiment shown in FIGS. 1 and 2 have a generally rectangular cross-section as shown in FIGS. 3, 4, 5 and 6. In particular the support column comprises a hollow square tube having the appropriate strength characteristics for lifting a vehicle; and by way of example only the square stock of tube shown in FIG. 6 can comprise a square tube which is 5½ inches by 5½ inches by ⅜ inch thick tube, having sufficient length to be lifted out of an inground pit. One end of the tube has a plate 17 welded thereto, with four anchoring holes 19. Although the support columns 14 and 16 may have any number of cross-sections such as circular, triangular or the like, it has been found that by utilizing a square or triangular cross-section the lift 10 exhibits favourable rigidity characteristics which resists swaying of the columns relative the lift 10. In other words the square or rectangular cross-section of the columns exhibit favourable moment of inertia which resist bending. The support columns 14 and 16 are adapted to be slidingly received within guide means 18. The guide means 18 depicted in the figures generally consists of plate 21 having a hole 23 which has a cross-section adapted to receive the cross-section of the support columns 14 and 16. In other words, the hole 23 is also square. The four corners of the square hold can be fitted with bushing material 20 such as polyethylene to co-axially slidingly receive the support columns 14 and 16. In particular the bushing 20 slidingly receive and guide the support columns 14 and 16 their movement from the first stored or inoperable position shown in FIG. 1 to the second operable or lifting position shown in FIG. 2. The bushing materials also reduces friction, and may be replaced if worn, as they are attached to the plate 21 in an appropriate fashion such as bolts or the like. Alternatively, the support columns 14 and 16 may be telescopingly received by square tubes (not shown) which are slightly larger to telescopingly receive the support columns 14 and 16 with the bushing material 20 placed between the support columns 14 and 16 and the said square tubes (not shown).

The columns 14 and 16 are generally comprised of suitable material such as steel or the like. The guide plate 18 may be bolted to the upper frame structure while upper plates 19 may also be fastened to the upper frame structure by welding or bolts.

The lift 10 also includes support frame means generally depicted by 30 which consists of an upper inner or stationary inner support frame 32 and a lower inner or moveable inner frame 34. Each inner support frame 32 and 34 may consist of a variety of configurations but in the figures consist of a pair of spaced apart channel iron 36 and 38 spaced and connected together by connecting channel irons 40, 42, 44 and 46 as illustrated in FIGS. 1 and 2. The plates 21 are disposed and firmly secured to the irons 36, 38, 40 and 42 as well as 36, 38, 44 and 46 respectively, by means of welding, bolts 5 or the like. The support frame means 30 also includes upper outer stationary frame 33 and lower outer stationary frame 35 which are jointed to the upper outer stationary frame 33 by means of connecting frame structure 37.

Figure 7:
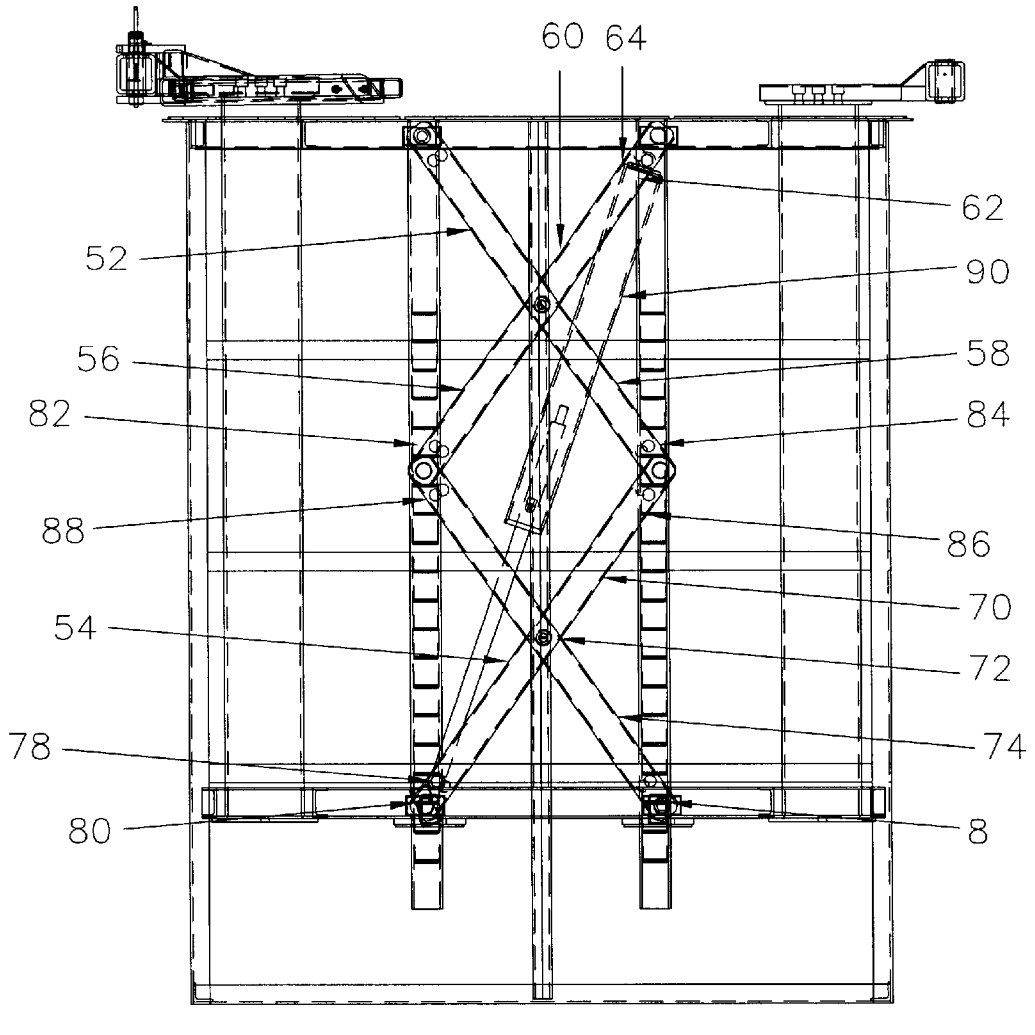
FIG. 7 is a side elevational view of the inground lift in the inground position.
Figure 8:
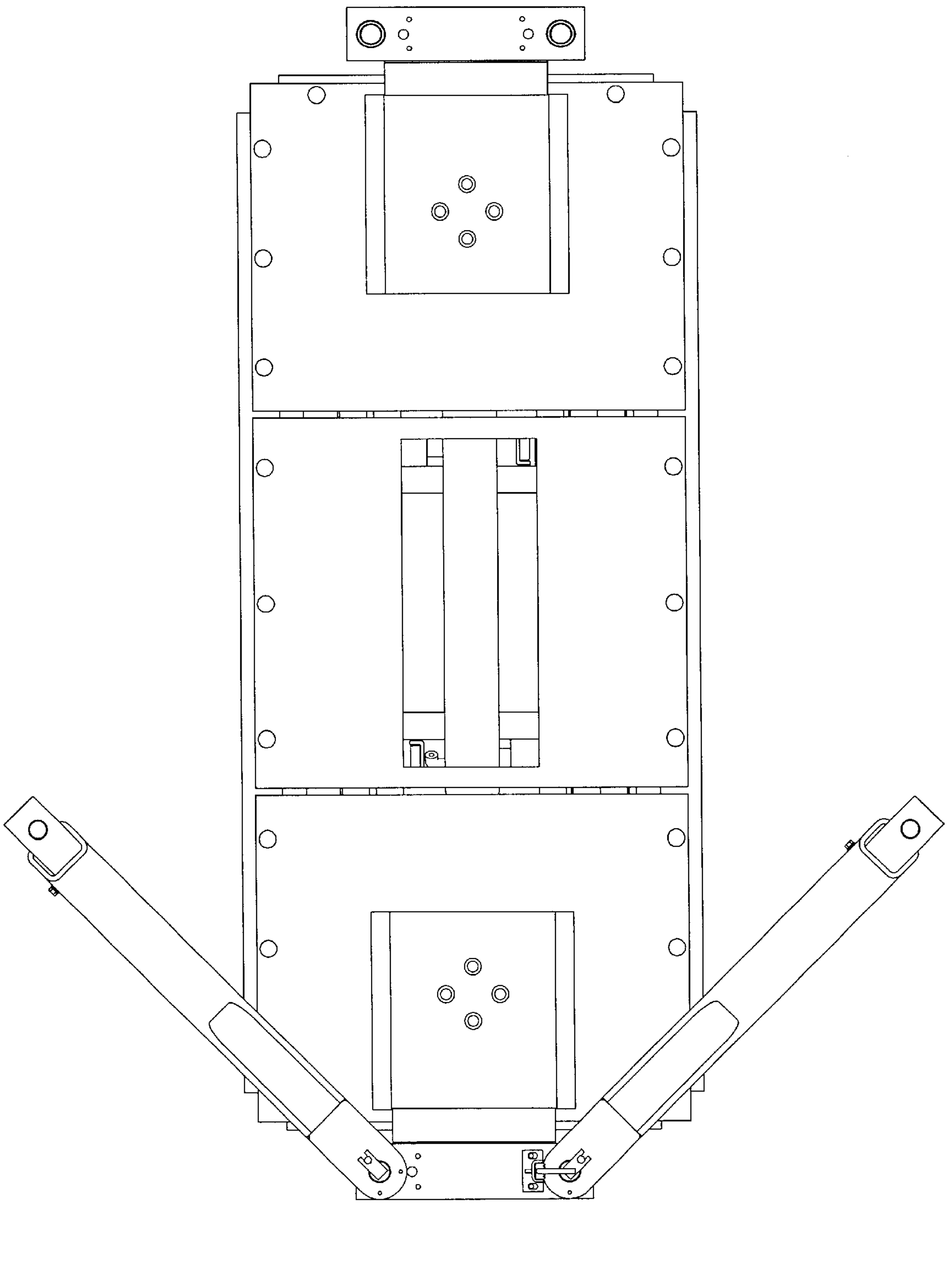
FIG. 8 is a top plan view of the inground lift.
Figure 9:
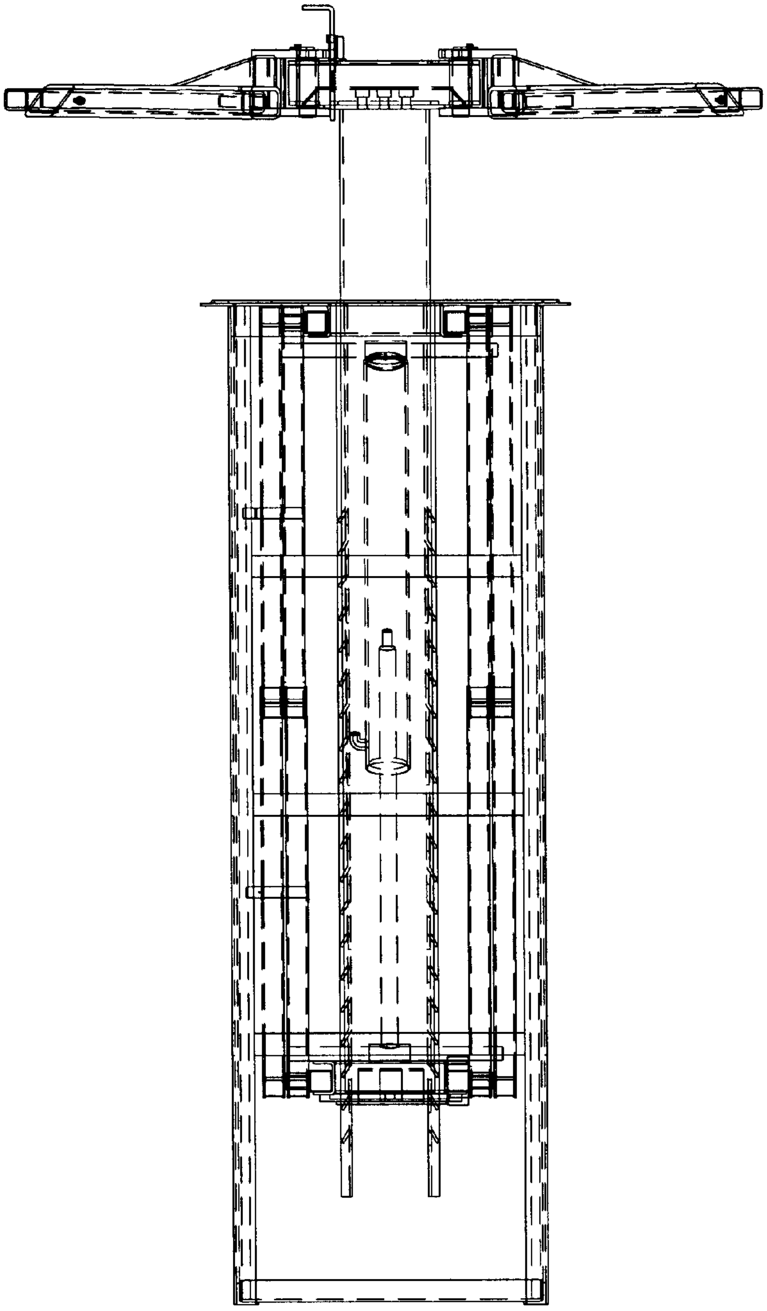
FIG. 9 is an end elevational view of the inground lift in a lowered position.
Figure 11:
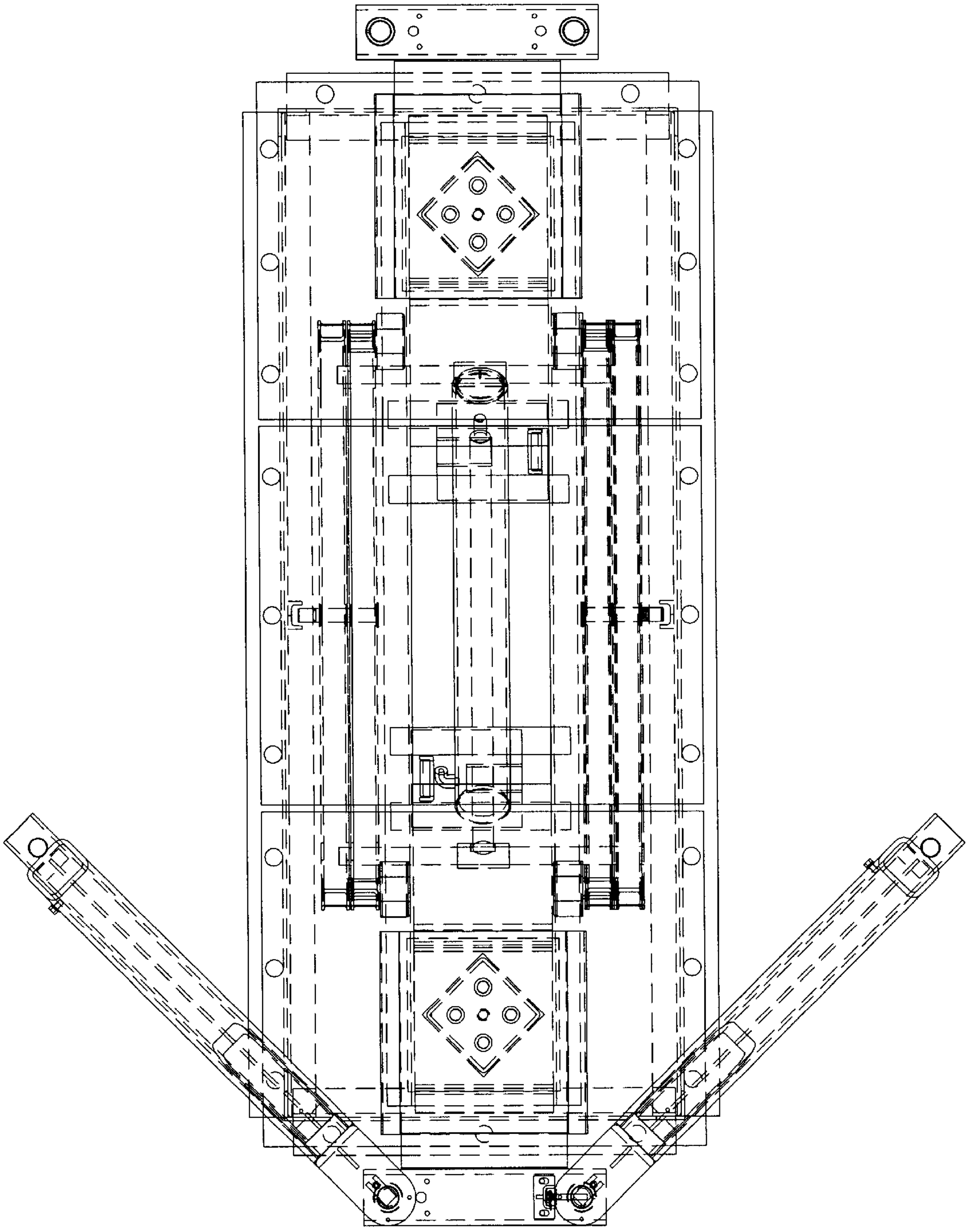
FIG. 11 is a top plan view of FIG. 10.
Figure 12:
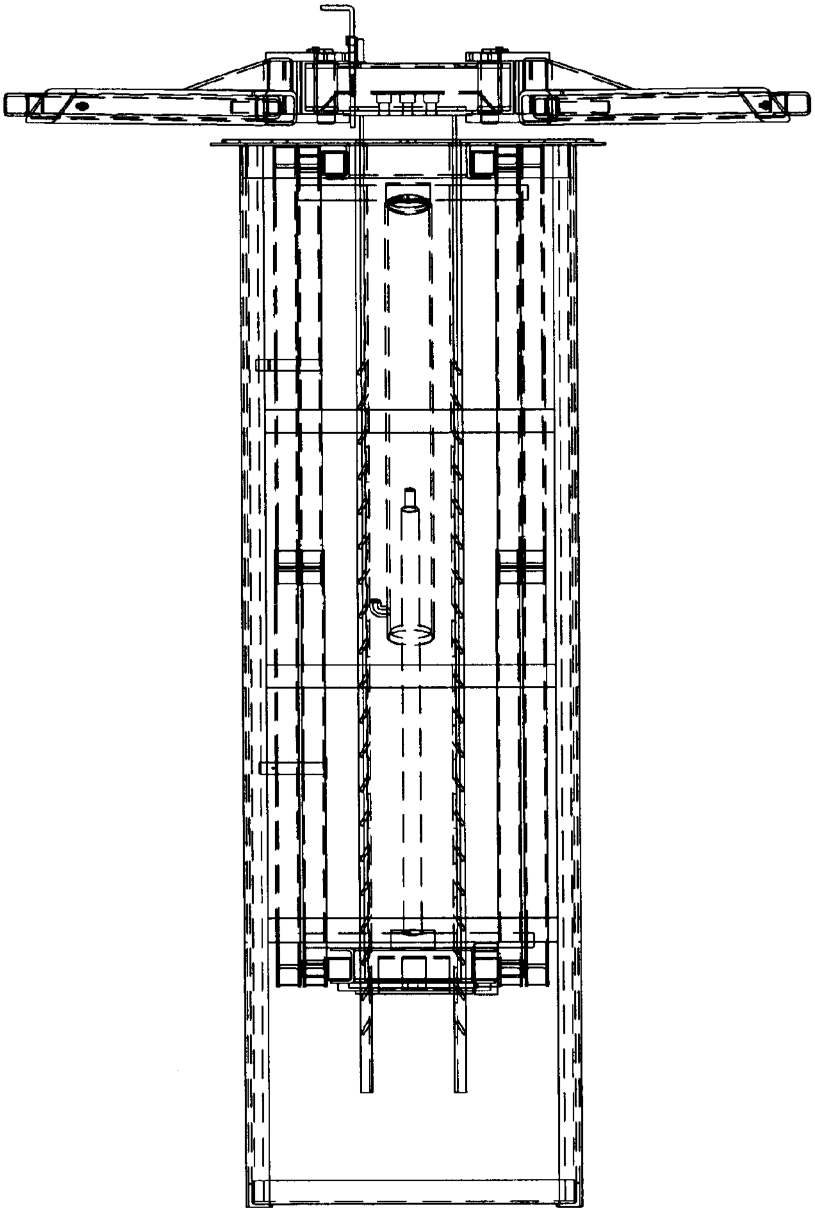
FIG. 12 is an end view of FIG. 10.

Scissor means generally illustrated as 50 are associated with the displaceable support means 12. In the embodiment to be described herein there are a pair of scissors as best seen in FIG. 11, one on each side of the cylinder 90. However, in the remaining views only one scissor is shown for the sake of clarity, although the second scissor is a mirror image of the scissor shown. More specifically the scissor means 50 comprise a first or upper pair of scissor assemblies 52 and a second or lower pair of scissor assemblies 54 all of which is more precisely illustrated in FIG. 7. The first pair of scissor assemblies 52 are spaced apart and disposed on either side of the channel irons 36 and 38. The second or lower pair of scissor assemblies 54 are disposed on either side of the channel irons 36 and 38.

The first or upper pair of scissor assemblies 52 and the second or lower pair of scissor assemblies 54 are disposed between the stationary support frame 32 and the moveable support frame 34.

Figure 10:
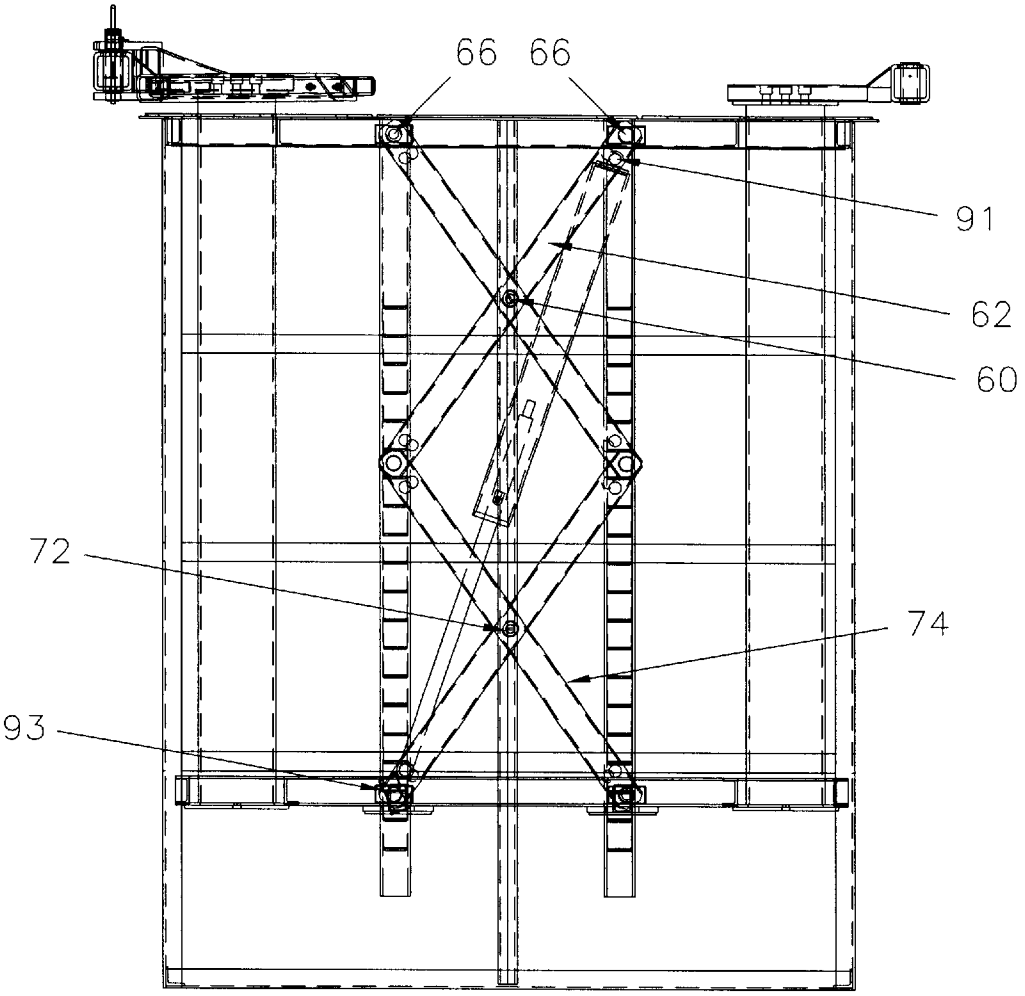
FIG. 10 is another side elevational view of the inground lift in a lowered position.

Each of the first or upper pair of scissor assemblies 52 comprise first and second arms 56 and 58 pivotally connected at 60 by means of pins or the like generally between their ends. The first upper scissor arm 56 has an upper end 62 slideably secured to the stationary support frame 32. The second scissor arm 58 has an upper end 64 slideably secured to the stationary support frame 32. In one embodiment upper end 60 and 64 includes rollers 66 adapted for slidable moveable displacement within the channel iron 36 as illustrated in FIG. 10.

Each of the second pair of scissor arm assemblies 54 include a first and second arm 68 and 70 pivotally connected at 72 between their ends. The first scissor arm 68 has lower end 74 slideably secured to the moveable support frame 34. The second scissor arm 70 has a lower end 78 slideably secured to the moveable support frame 34. In one embodiment lower end 74 and 78 include rollers 80 adapted to be received for slidable movement within the channel iron 36.

Alternatively, the upper end 62 of first upper scissor arm 56 could be pivotally attached to the stationary support frame 32, and the lower end 78 of scissor arm 68 pivotally connected to moveable support frame 34; with the upper end 64 of second scissor arm 58 and lower end 78 of second scissor arm 70 slideably secured to channel iron 36.

The lower ends 82 and 84 of the first or upper scissor arms 56 and 58 respectively are pivotally connected to the upper arms 86 and 88 of second and first scissor arms of lower scissor arm assemblies 54.

The inground lift also includes a hydraulic cylinder 90 having one end 91 secured to one of the upper arms 56 and the other end to one of the arms 68 of lower scissor arm assemblies 54. When the hydraulic cylinder 90 is activated by hydraulic or pneumatic means in a manner well known to those persons skilled in the art where the device 10 moves from the stored or inground position to the operable lifting position shown in FIGS. 1 and 2, respectively. In other words the hydraulic cylinder 90 pulls the various arms of the scissor assemblies together in a manner whereby the linkages articulate and compress to the structure shown in FIG. 2. The hydraulic cylinder 90 is pivotally attached at one end 91 to the upper end 62 of upper arm 56 and at the lower end 93 to the lower end 78 of arm 70. Alternatively, the lower end 93 of cylinder 90 could be attached to the upper portion of scissor arm 68, while the upper end 91 of cylinder could be attached to the stationary frame 32.

Figure 13:
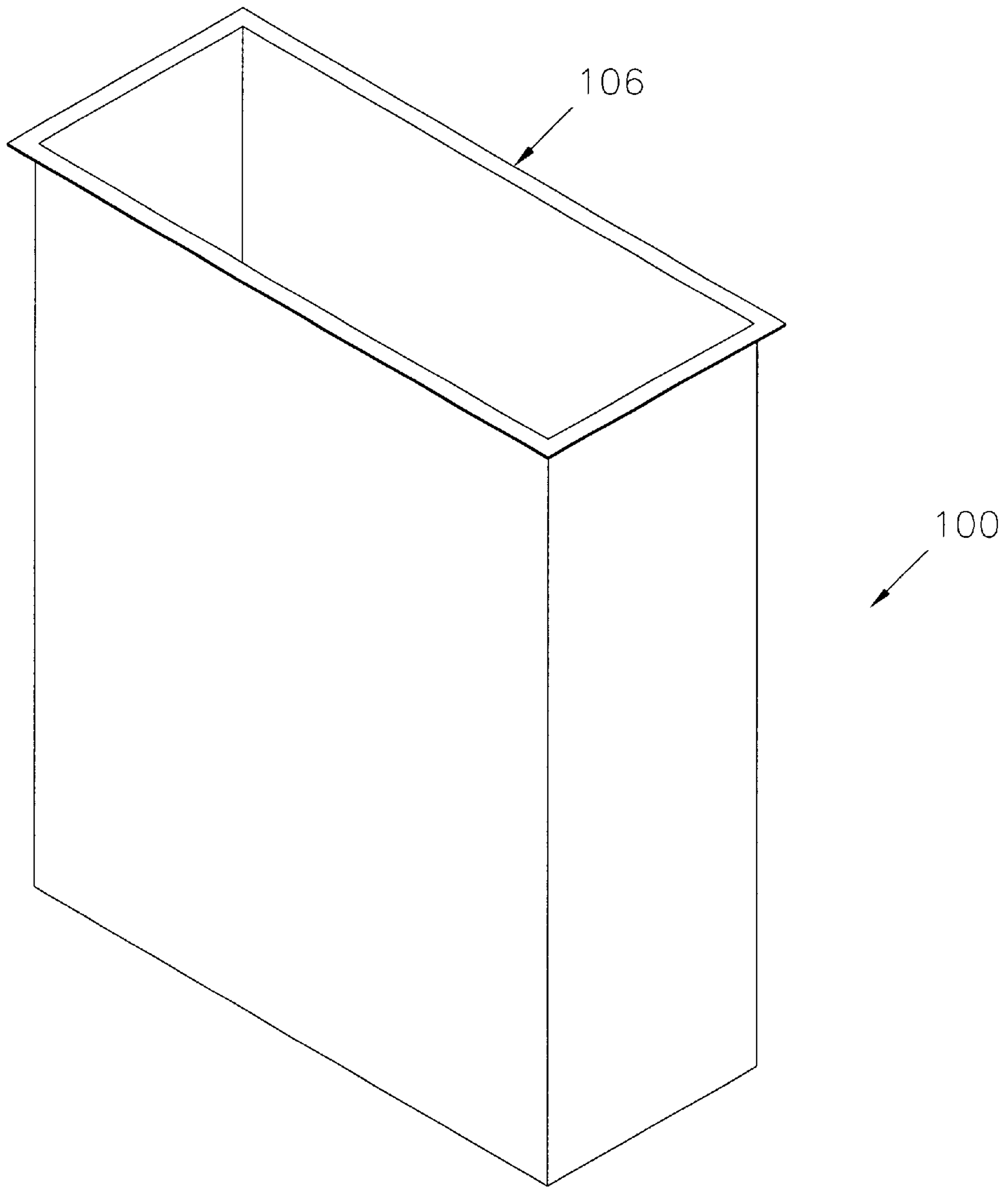
FIG. 13 is a perspective view of the receptacle.
Figure 14:
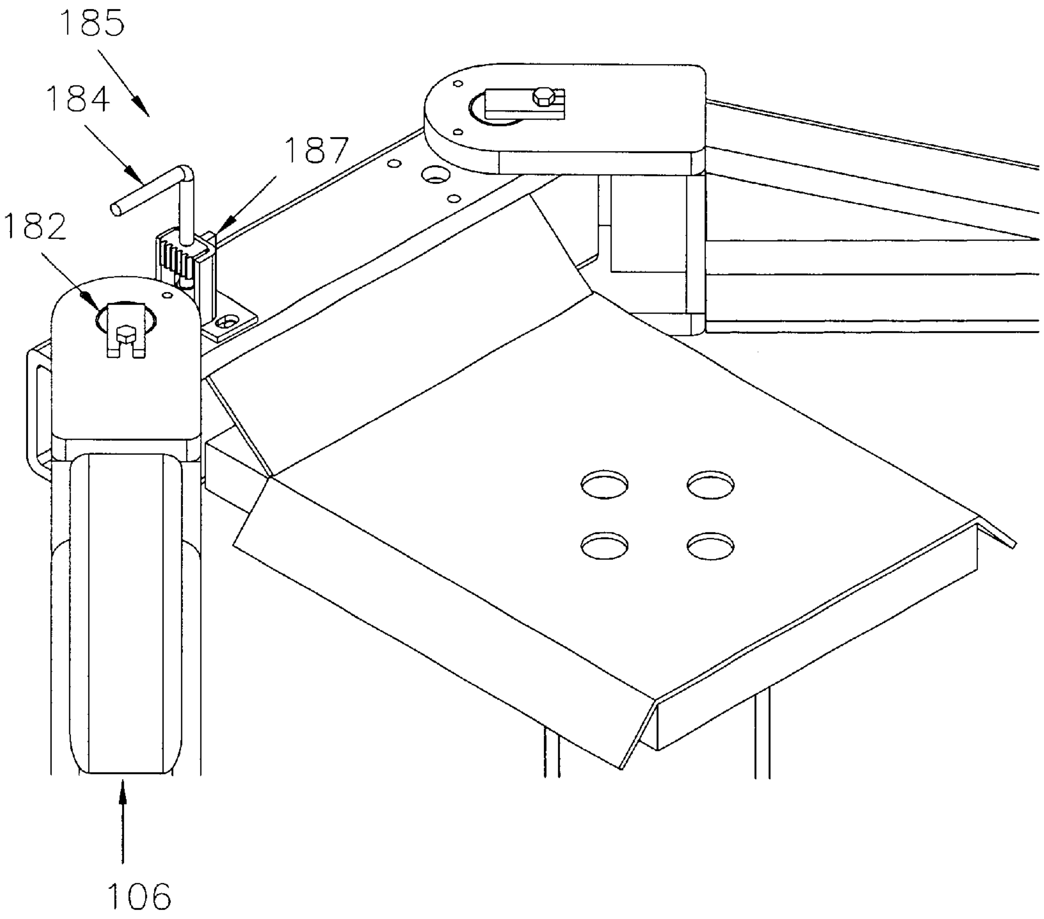
FIG. 14 is a perspective view of the arms.

The device 10 also includes a receptacle 100 which contains all of the components referred to above and is best shown in FIG. 13. The receptacle 100 is adapted to be placed within a pit 102 dug in the ground. The pit 102 will receive the receptacle so that the upper end of the receptacle 106 is substantially in line or level with the top of the ground. The top of the ground in most cases will be a concrete floor whether located in a garage or the like such that an automobile may drive over the receptacle with the inground lift in its inground or inoperable position. The receptacle 100 is environmentally friendly as it prevents seepage of any hydraulic or pneumatic fluid that may leak from the device and prevent same from infiltrating into the ground and cause an environmental hazard.

As best seen in FIGS. 1 and 2 the top ends of the support columns 120 and 122 each include vehicle engaging means 124 which generally comprise support arms 180 mounted by pivot pins 182. The pivot pins 182 are shaped to support a cantilevered load at the end of the support arms 180. Each support arm 180 comprises an inner moveable bar section 183 and an outer section 184. The outer section has gear teeth attached to it in the vicinity of and co-axially with the pivot pin 182 to permit the outer sections 184 to be rotated about pin 182 to adjust the arms 180 properly below the vehicle. Thereafter locking means 185 having locking teeth 187 may be dropped to engage the gear teeth within outer sections 184 and lock the arms 180, when the lift 10 is used to lift the vehicle for servicing. Once service of the vehicle is completed, the lift can be lowered and the locking handle 189 lifted to disengage locking teeth 187 from the gear teeth to permit rotation of the arms 184.

Each of the outer end of each arm 180 may include a pair of support pads that may be adjusted so as to properly support and lift a vehicle driven thereon.

The inground lift also includes a safety locking feature to be described herein. More particularly the inground lift 10 includes vertically disposed locking bars 130 including a plurality of angled teeth 132 which are adapted to mesh with a pawl or extension 134. In the embodiment disclosed in FIG. 15 two locking bars 130 are utilized one of which is attached to one side of the channel iron 36 with the other bar 130 attached to the other side of the channel iron 38, as best seen in FIG. 1. The lower portion of the locking bars 130 are attached to the lower outer frame structure 35 as best seen in FIG. 2.

Figure 15:
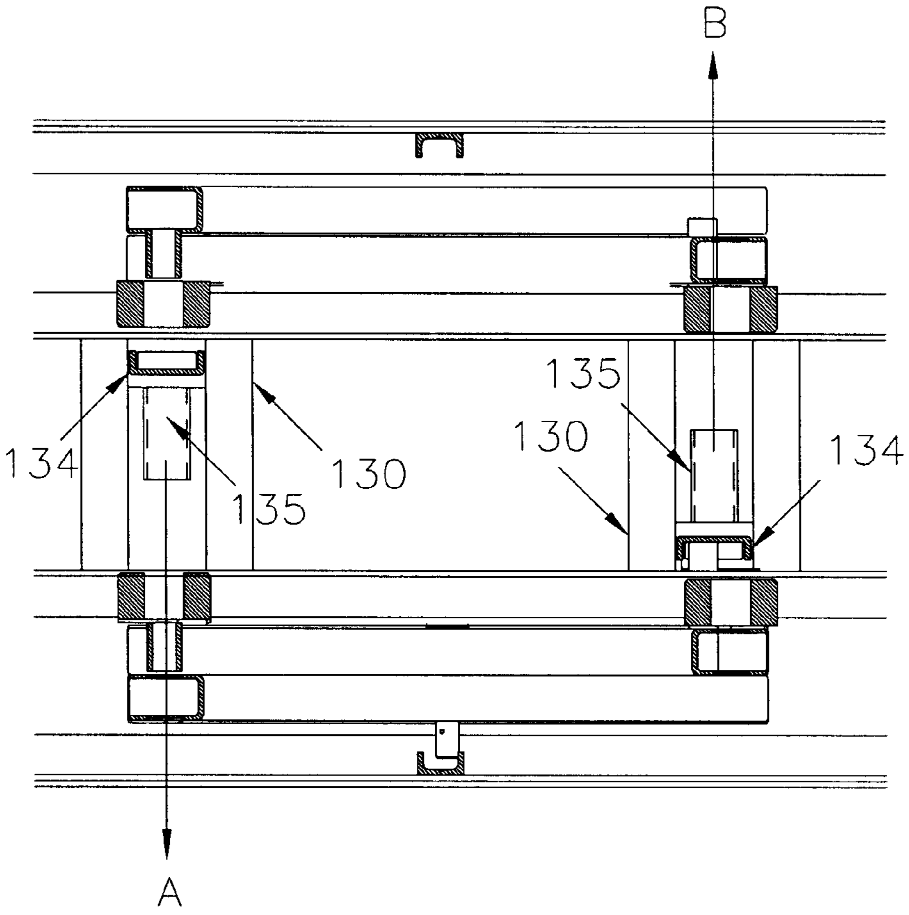
FIGS. 15 and 16 is a top and side elevational view of the safety locking mechanism.
Figure 16:
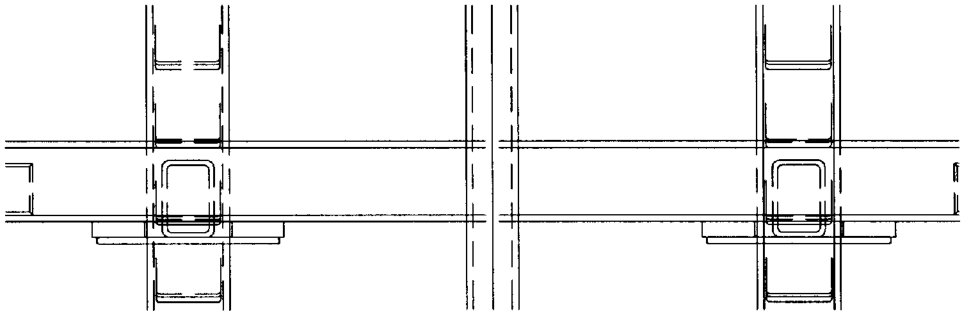
Figure 17A:
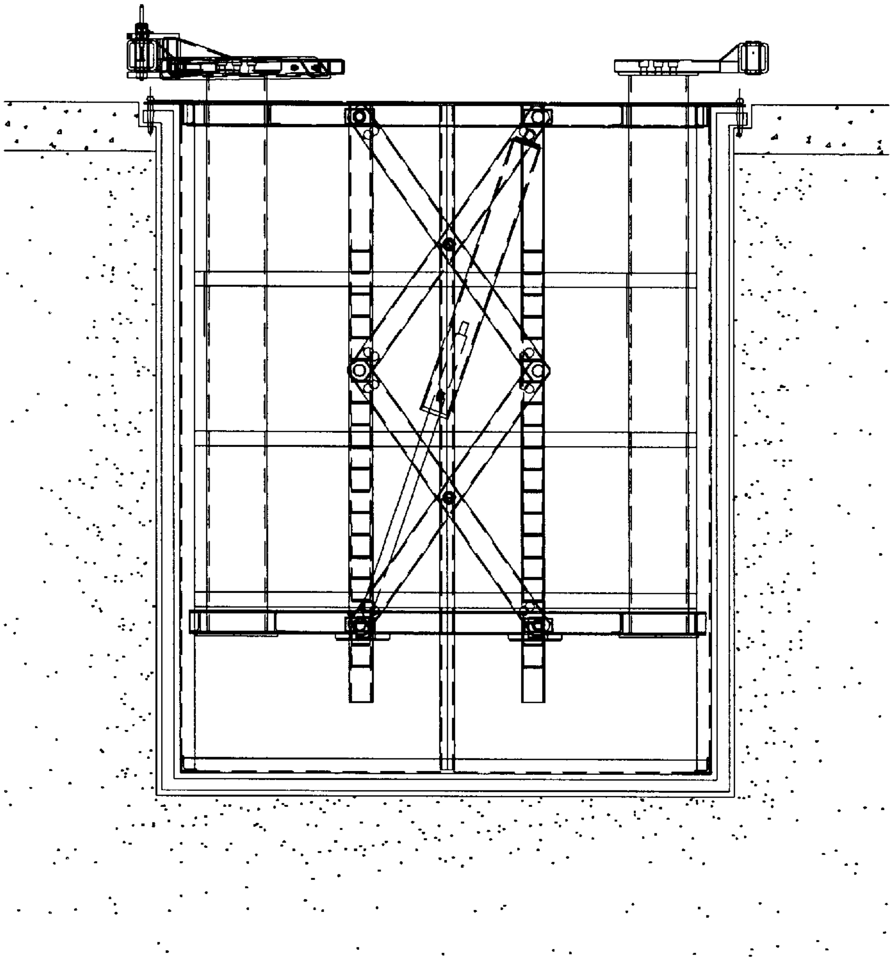
FIG. 17 is a side elevational view of the inground lift in a raised position.
Figure 17B:
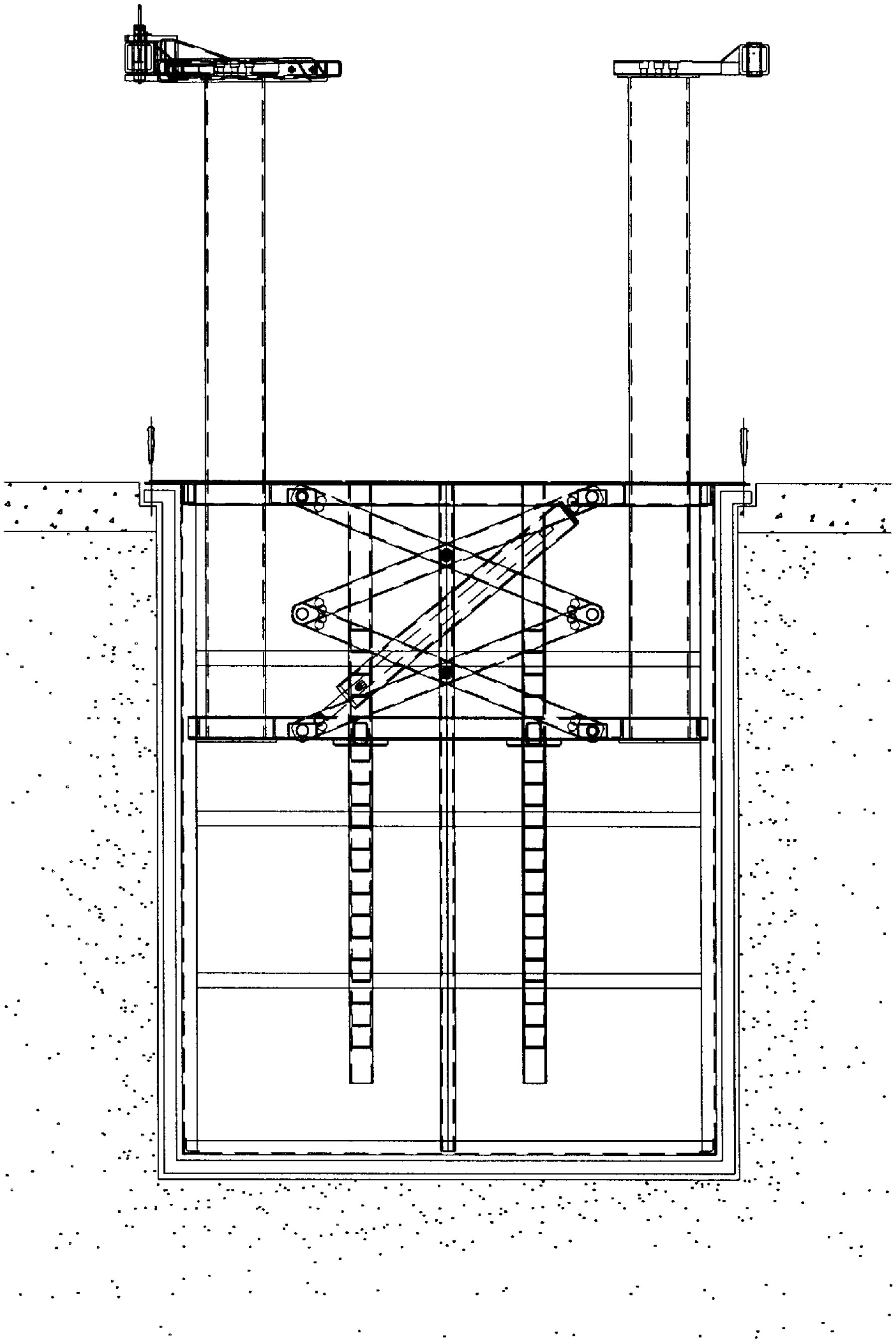
Figure 18:
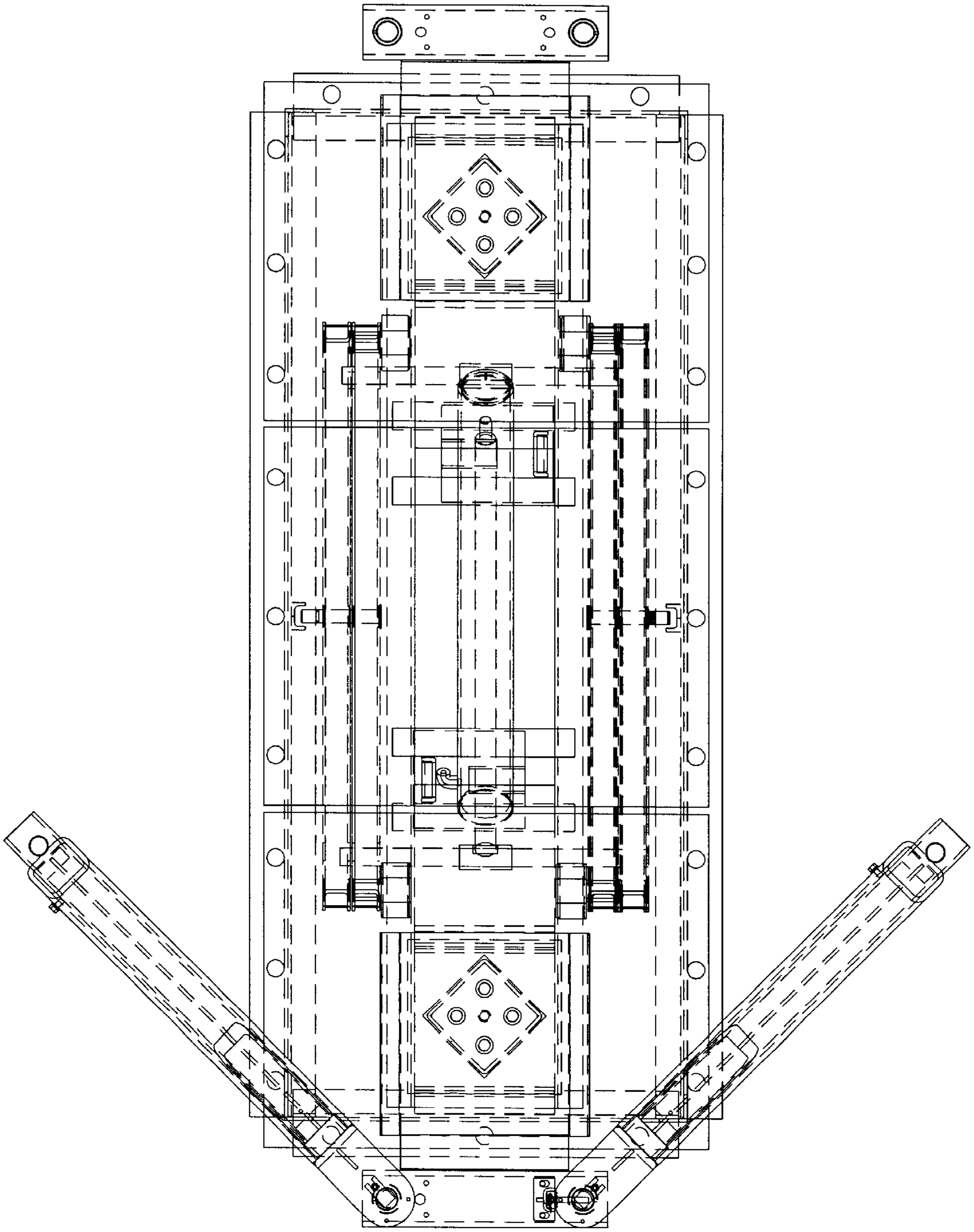
FIG. 18 is a top plan view of FIG. 17.
Figure 19:
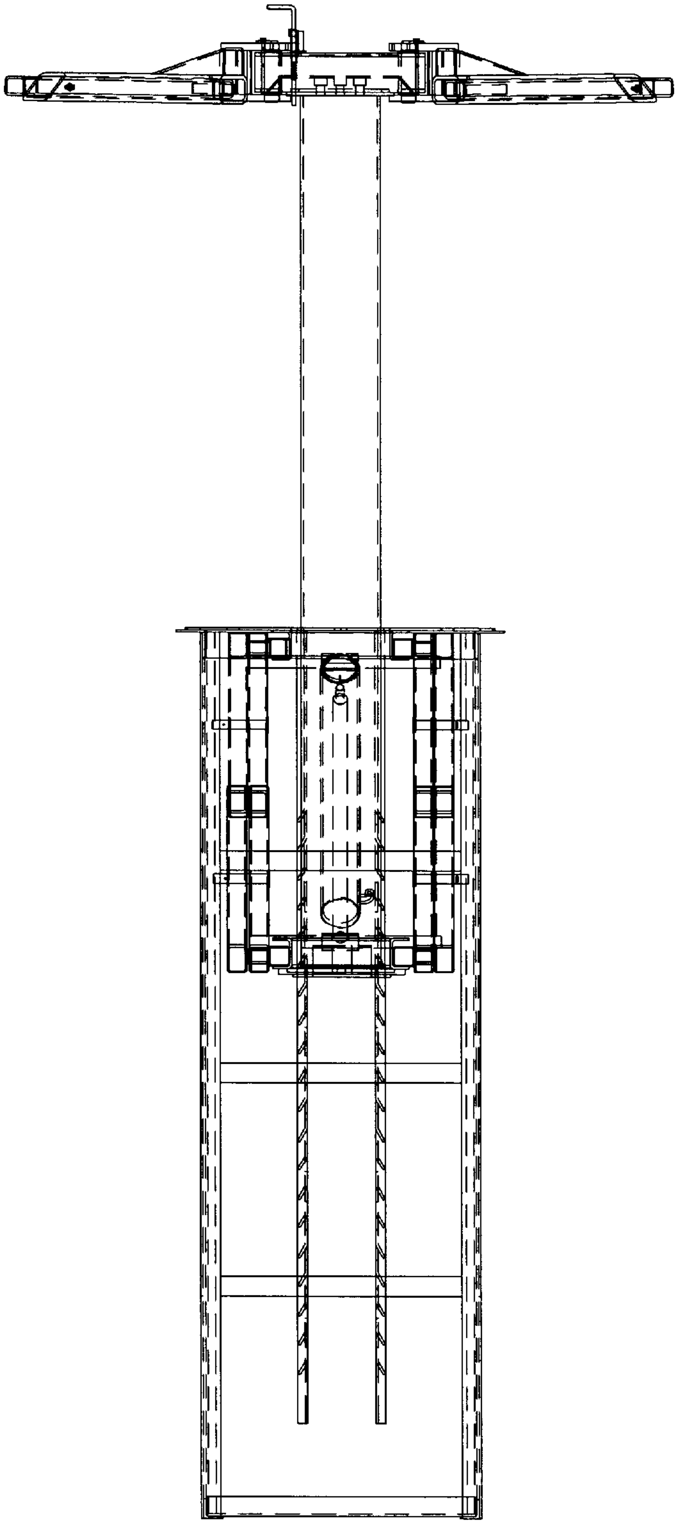
FIG. 19 is an end view of FIG. 17.
Figure 20:
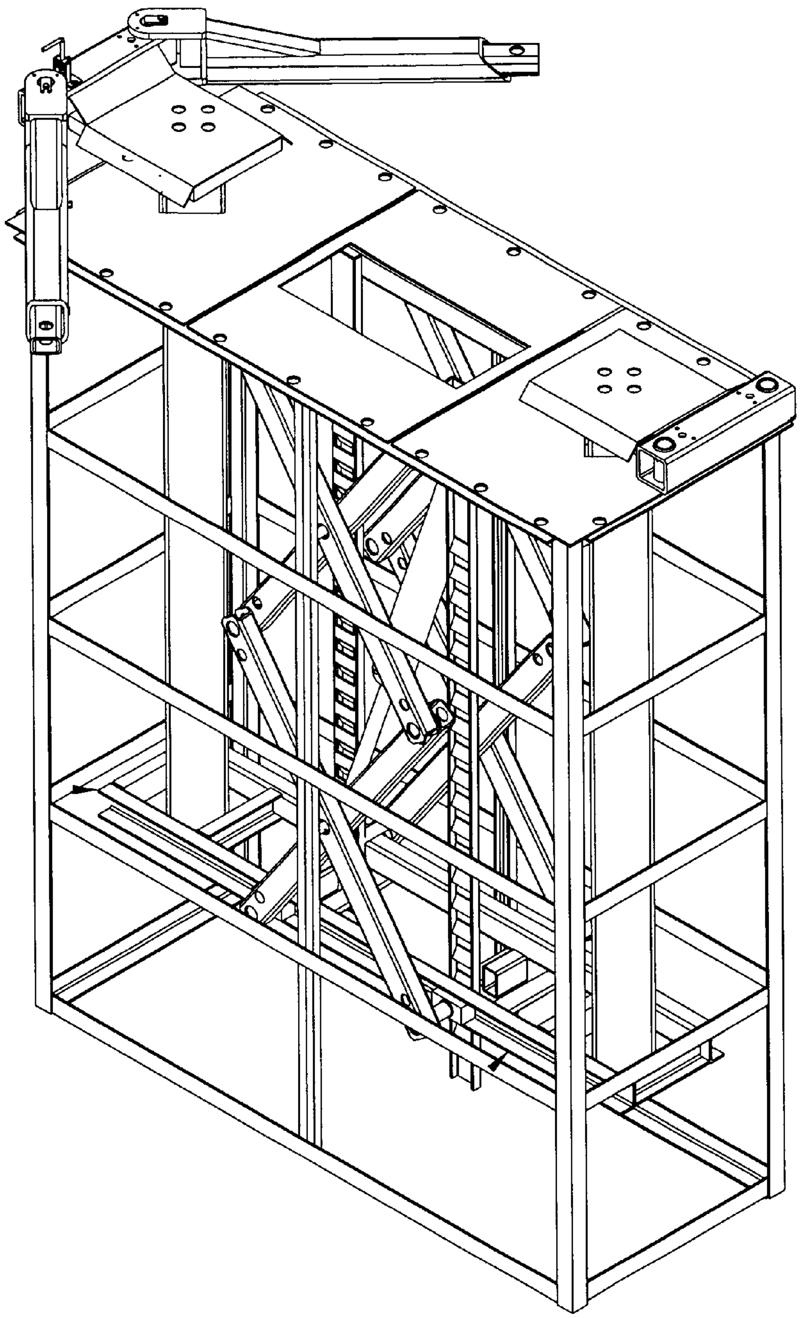
FIG. 20 is a further perspective view of the lifting mechanism in a lowered position.
Figure 21:
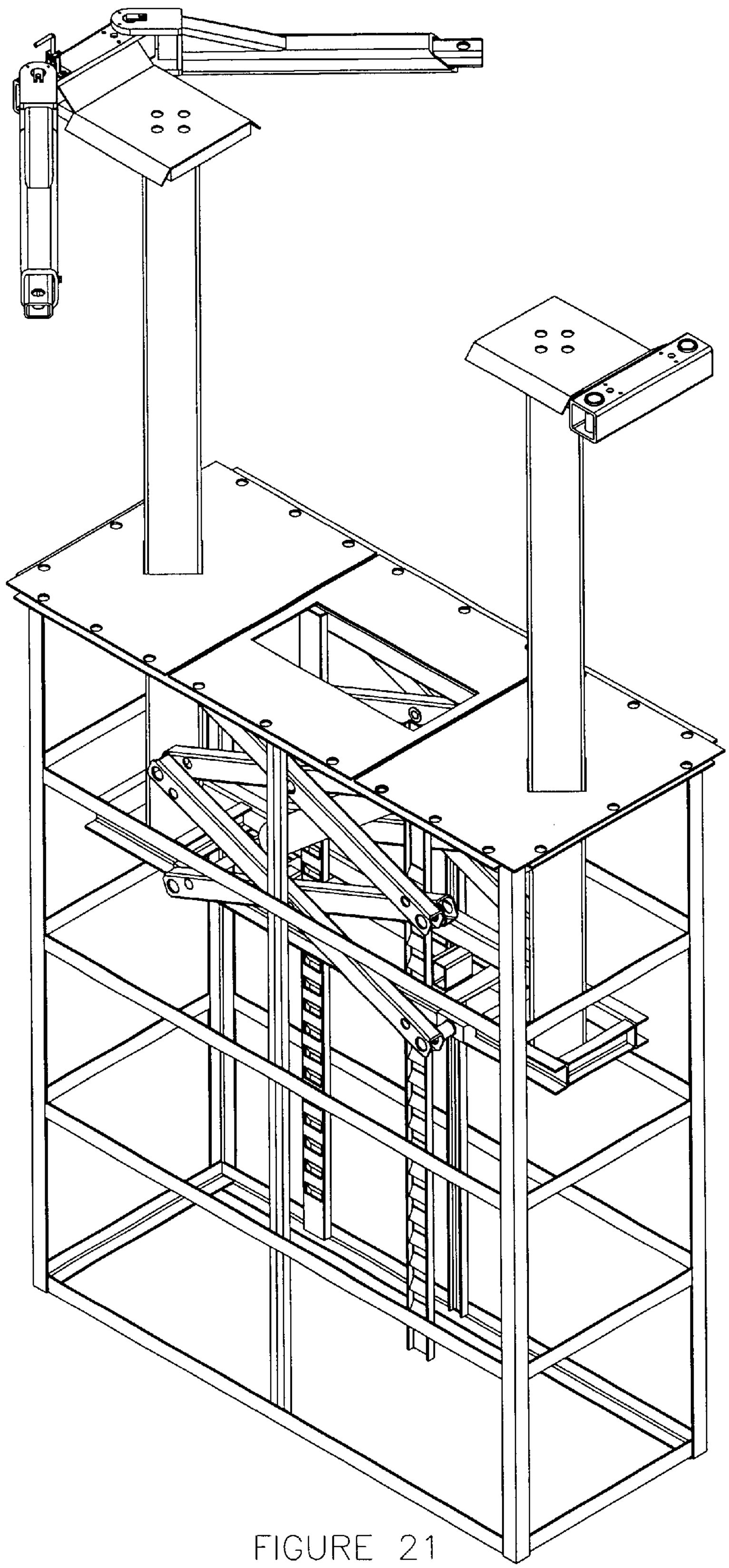
FIG. 21 is a further perspective view of the lifting mechanism in a raised position.

Each of the pawls 134 are adapted for horizontal slidable movement in the direction of arrows A and B as shown in FIG. 15. The pawls 134 each have an extension 135 which are adapted to contact a spring or piston to bias the locking teeth 134 with the angled teeth 132 of bars 130.

As the lift 10 is raised the pawls attached to the moveable frame 34 slide away from the angled teeth 132 to permit the lift 10 to be raised. While lifting the extensions 135 move against the biasing frame of the spring or cylinder (not shown) and snap or spring back against the angled teeth to produce an audible click. In an emerging situation such as a sudden loss of pressure to the cylinder 90 the lift 10 is prevented from dropping because of the engagement of the pawl 134 with the angled teeth 132. When lowering the lift 10 the pawls are disengaged from the angled teeth by the extensions 135 attached to the pawls 134 in the direction of arrows A and B, by means of hydraulic or pneumatic cylinders or the like.

Accordingly, in operation a vehicle may be driven over the inground lift when the lift is in the inground or stored position as shown in FIG. 1. Thereafter the appropriate supporting arms may be adjusted under the vehicle so that when the hydraulic cylinder 90 is activated the scissors move from that position shown in FIG. 1 to the lift position shown in FIG. 2 so as to raise the vehicle to be worked on. Thereafter the lift may be lowered in the fashion described.

The inground lift described herein provides a safe environmentally friendly lift which can be easily and quickly returned to the stored position thereby providing ample space in a garage for movement thereabout.

The lift is generally constructed of steel or the like having the appropriate strength characteristics and the various parts may be bolted or welded together. Furthermore the structure as shown herein exhibits superb stability features.

Various embodiments of the invention have now been described in detail. Since changes in and/or additions to the above-described best mode may be made without departing from the nature, spirit or scope of the invention, the invention is not to be limited to said details.

Although the preferred embodiment as well as the operation and use have been specifically described in relation to the drawings, it should be understood that variations in the preferred embodiment could be achieved by a person skilled in the trade without departing from the spirit of the invention as claimed herein.

What is claimed is:

1. A lift for a vehicle comprising:

(a) a displaceable support means moveable between a first inground position to a second above ground position for supporting said vehicle;

(b) scissor means associated with said displaceable support means for lifting said displaceable support means and said vehicle;

(c) support frame means disposed inground, said support frame means including a stationary support frame means and a moveable support frame means disposed below said stationary support frame, said scissor means having one end connected to said stationary support means and another end connected to said moveable support means for moving said displaceable support means between said first and second positions.

2. A lift as claimed in claim 1 including guide means adapted to be disposed inground for guiding said displaceable support means.

3. A life as claimed in claim 2 wherein said support frame means presents said guide means.

4. A lift as claimed in claim 3 further including an enclosure disposed inground for receiving said displaceable support means, support frame means, scissor means and guide means.

5. An inground lift for lifting a vehicle comprising:

(a) support frame means adapted to be disposed in a pit said support frame means including a stationary support frame and a moveable support frame means disposed below said stationary frame;

(b) displaceable support means co-operating with said stationary and moveable support frame means and moveable between a first inground position to a second support position so as to lift said vehicle;

(c) scissor means associated with said displaceable support means for moving said displaceable support means and said vehicle from said first position to said second support position;

(d) said scissor means connected at one end to said stationary support means and connected at another end to said moveable support means for moving said displaceable means between said positions.

6. An inground lift for a vehicle comprising:

(a) support frame means adapted to be disposed in a pit;

(b) displaceable support means co-operating with said support frame means and moveable between a first inground position to a second support position so as to lift said vehicle;

(c) scissor means associated with said displaceable support means for moving said displaceable support means and said vehicle from said first position to said second support position;

(d) said support frame comprising:

(i) a stationary support frame; and (ii) a moveable support frame disposed below said stationary support frame.

7. An inground lift as claimed in claim 6 wherein said displaceable support means comprises displaceable column means.

8. An inground lift as claimed in claim 7 wherein one end of said displaceable column means is fixedly secured to said moveable support frame and said other end of said column means is displaceable relative said stationary support frame.

9. An inground lift as claimed in claim 8 wherein said stationary support means includes guide means for guiding said displaceable column means.

10. An inground lift as claimed in claim 9 wherein said guide means comprises a bushing adapted to slideably receive said displaceable column means.

11. An inground lift as claimed in claim 10 wherein said stationary support means presents bushings and said displaceable column means comprises two square columns slideably received by said bushings respectively, for movement between said inground position to a second support position so as to lift said vehicle.

12. An inground lift as claimed in claim 11 wherein said scissor means comprises:

(a) a first and second pair of scissor assemblies disposed between said stationary support frame and said moveable support frame;

(b) each of said first pair of scissor assemblies comprising:

(i) first and second arms pivotally connected between their ends;

(ii) said first scissor arm having an upper end slideably secured to said stationary support frame;

(iii) said second scissor arm having an upper end slideably secured to said stationary support frame;

(c) each of said second pair of scissor arm assemblies comprising:

(i) first and second arms pivotally connected generally between their ends;

(ii) said first scissor arm having a lower arm end slideably secured to said moveable support frame;

(iii) said second scissor arm having a lower arm slideably secured to said moveable support frame;

(d) said lower ends of said first and second arms of said first pair of scissor assemblies pivotally connected to the upper ends of said first and second arms of said second pair of scissor arm assemblies.

13. An inground lift as claimed in claim 12 further including actuating means for moving said first and second pair of scissor assemblies between said first inground position to said second support position.

14. An inground lift as claimed in claim 13 further including an enclosure adapted to be disposed inground; said enclosure for housing said support frame means, displaceable support means, and scissor means.

15. An inground lift as claimed in claim 14 wherein said enclosure prevents seepage of fluid from said enclosure to said ground.

16. An inground lift as claimed in claim 12 including actuating means comprising a hydraulic cylinder (a) having one end connected to said first pair of scissor assemblies, (b) another end connected to one of said first or second scissor arms of said second pair of scissor arm assemblies.

17. An inground lift for lifting a vehicle comprising:

(a) a pit in the ground;

(b) a receptacle disposed within said pit and having an upper end substantially level with said ground;

(c) an upper stationary support frame fixedly secured to said upper end of said receptacle, and presenting two spaced guide bushings;

(d) a lower support frame moveable within said receptacle;

(e) an upper and lower pair of scissor assemblies disposed between said stationary support frame and said moveable support frame;

(f) each of said upper pair of scissor assemblies comprising:

(i) first and second arms pivotally connected generally between their ends;

(ii) said first scissor arm having an upper end slideably secured to said stationary support frame;

(iii) said second scissor arm having an upper end slideably secured to said stationary support frame;

(g) each of said lower pair of scissor arm assemblies comprising:
(i) first and second scissor arms pivotally connected generally between their ends;
(ii) said first scissor arm having a lower end slideably secured to said moveable support frame;
(iii) said second scissor arm having a lower end slideably secured to said moveable support frame;
(h) said lower ends of said first and second arms of said upper pair of scissor assemblies pivotally connected to the upper arms of said first and second arms of said lower pair of scissor arm assemblies;
(i) a pair of support columns, each said support column having one end secured to said lower moveable support frame and an upper end slideably received by said guide bushings;
a hydraulic cylinder having one end connected to one of said first and second scissor arms of said upper pair of scissor arm assemblies and the other end connected to one of said first and second scissor arms of said lower pair of scissor arm assemblies.

18. An inground lift as claimed in claim 17 wherein said receptacle is leak proof.

* * * * *